(12) United States Patent
Todorovic et al.

(10) Patent No.: US 8,850,824 B2
(45) Date of Patent: Oct. 7, 2014

(54) AIRCRAFT GAS TURBINE WITH VARIABLE BYPASS NOZZLE BY DEFORMING ELEMENT

(75) Inventors: Predrag Todorovic, Berlin (DE); Miles Trumper, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 74 days.

(21) Appl. No.: 13/541,260

(22) Filed: Jul. 3, 2012

(65) Prior Publication Data

US 2013/0008147 A1   Jan. 10, 2013

(30) Foreign Application Priority Data

Jul. 8, 2011   (DE) .......................... 10 2011 106 959

(51) Int. Cl.
*F02K 1/08*    (2006.01)
*F02K 3/02*    (2006.01)
*F02K 1/82*    (2006.01)

(52) U.S. Cl.
CPC . *F02K 1/085* (2013.01); *F02K 1/08* (2013.01); *F02K 1/827* (2013.01)
USPC .......... 60/771; 60/262; 60/226.3; 239/265.43

(58) Field of Classification Search
CPC ............ F02K 1/08; F02K 1/085; F02K 1/827
USPC ............ 60/260, 226.3, 771, 262; 239/265.43, 239/265.13
See application file for complete search history.

(56) References Cited

U.S. PATENT DOCUMENTS

| | | | |
|---|---|---|---|
| 3,598,318 A * | 8/1971 | Schiel ...................... 239/265.13 |
| 4,043,508 A * | 8/1977 | Speir et al. ............... 239/265.19 |
| 5,721,402 A * | 2/1998 | Parente .......................... 181/214 |
| 7,966,828 B2 * | 6/2011 | Cini et al. ........................ 60/771 |
| 2003/0126856 A1* | 7/2003 | Lair ................................ 60/262 |
| 2008/0163606 A1* | 7/2008 | Cini et al. ........................ 60/204 |
| 2008/0166227 A1 | 7/2008 | Sheaf et al. |
| 2009/0067993 A1* | 3/2009 | Roberge et al. ............... 415/145 |
| 2009/0208328 A1* | 8/2009 | Stern ............................. 415/145 |
| 2010/0043394 A1 | 2/2010 | Pero |

FOREIGN PATENT DOCUMENTS

| | | |
|---|---|---|
| DE | 2638883 | 6/1977 |
| DE | 2711936 | 9/1978 |
| JP | 2001050110 | 2/2001 |

OTHER PUBLICATIONS

German Search Report dated Mar. 12, 2012 from counterpart application.

* cited by examiner

*Primary Examiner* — Ehud Gartenberg
*Assistant Examiner* — Jason H Duger
(74) *Attorney, Agent, or Firm* — Timothy J. Klima; Shuttleworth & Ingersoll, PLC

(57) ABSTRACT

The present invention relates to an aircraft gas turbine with a core engine which is surrounded by a bypass duct enclosed radially outwards by a bypass wall, with a radially inner wall of the bypass duct forming with the radially outer bypass wall a bypass nozzle, and with the radially inner wall including an adjusting element extending along the circumference of the inner wall and being deformable radially outwards.

10 Claims, 8 Drawing Sheets

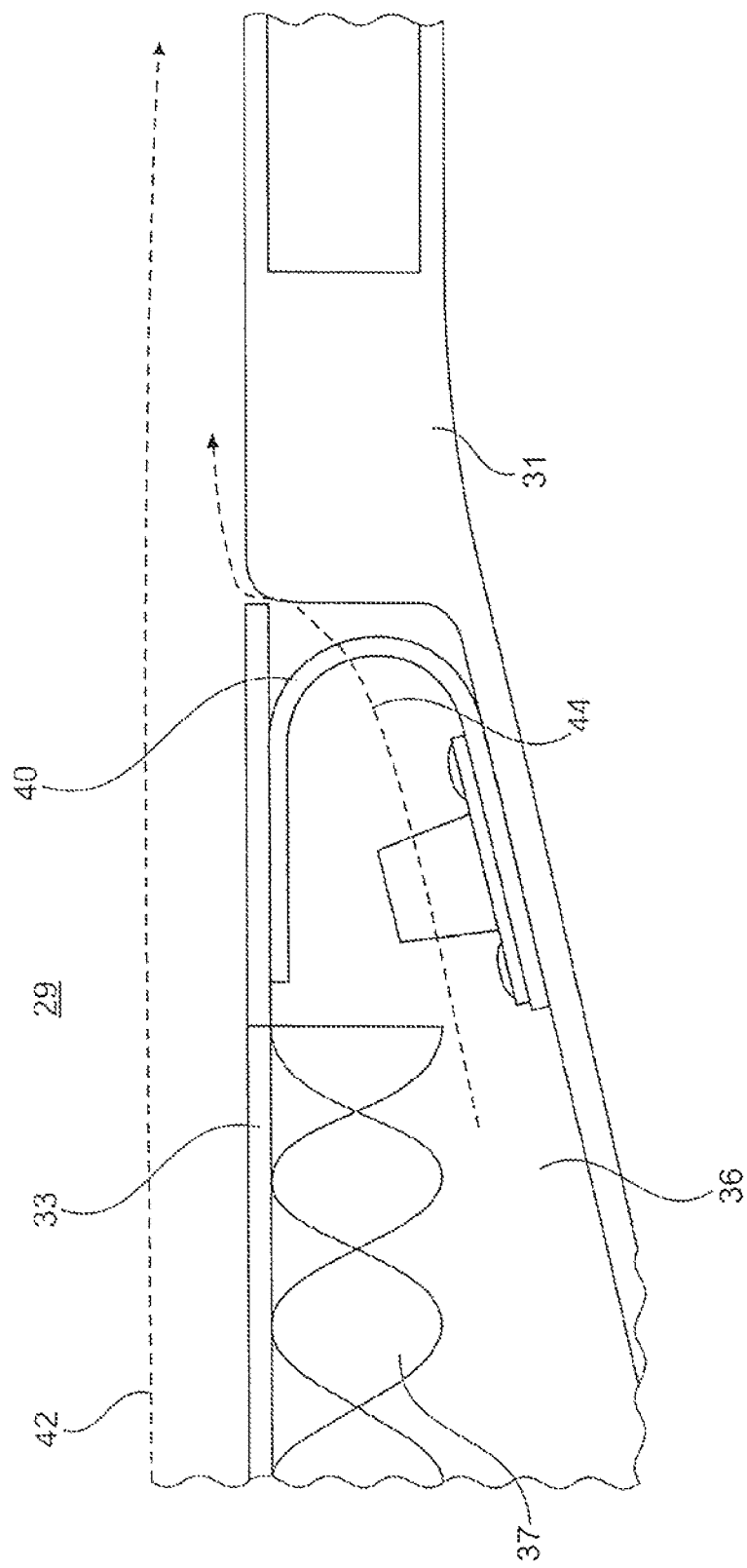

AIRCRAFT GAS TURBINE WITH VARIABLE BYPASS NOZZLE BY DEFORMING ELEMENT

Figure 1:
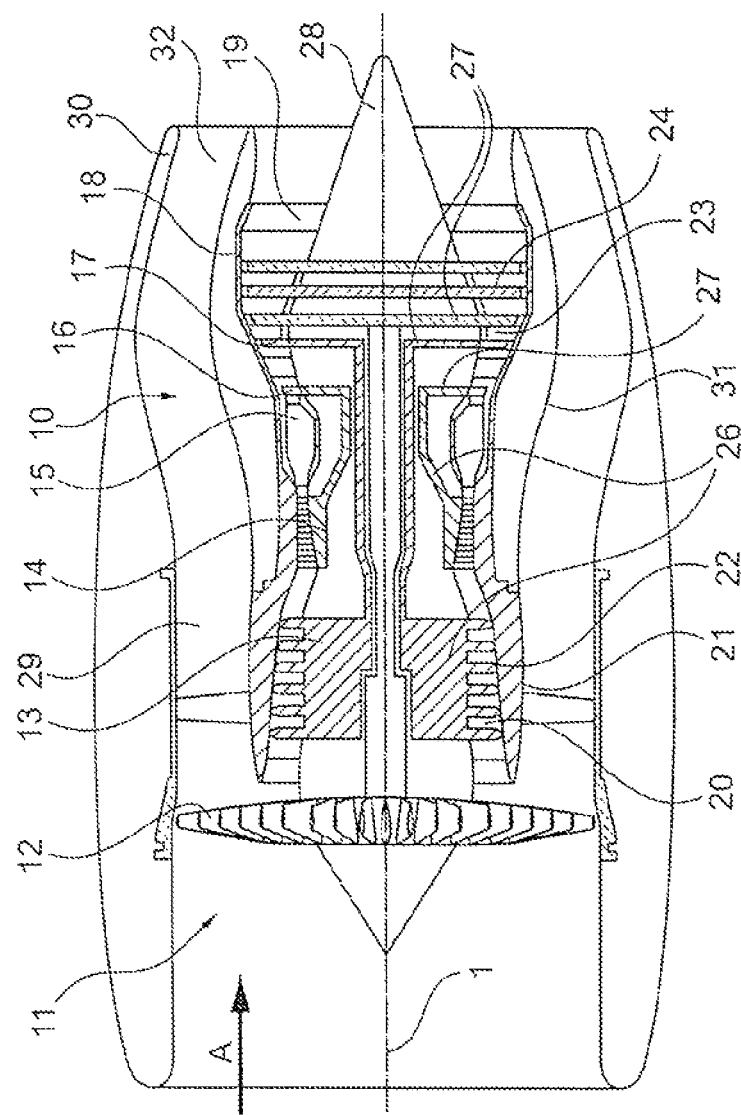

This application claims priority to German Patent Application DE102011106959.7 filed Jul. 8, 2011, the entirety of which is incorporated by reference herein.

This invention relates to an aircraft gas turbine with a core engine surrounded by a bypass duct.

It is known from the state of the art to design and dimension a bypass duct in such a way that it forms a nozzle at the outflow area in order to use the additional thrust of the bypass duct effectively.

The development of modern aircraft gas-turbine engines with a fan driven by a transmission necessitates variable design of the bypass nozzle in order to use effectively the working principle of a fan provided with a transmission. The systems known from the state of the art are mostly arranged on the trailing edge of the engine cowling (nacelle). Segmented parts of the trailing edge are known here which are moved radially outwards or inwards by actuating devices. In another solution, the entire trailing edge, which is designed as a separate ring, moves in the axial direction. Furthermore, solutions are known in which the inner engine structure surrounding the core engine is designed variable, for example by moveable segments or by axially moveable outflow parts.

For the state of the art, reference is made for example to US 2008/0166227 A1.

Overall, the disadvantage of solutions known from the state of the art is that a large number of components is required, that actuation is complex and elaborate, and that the low thickness of the trailing edge of the bypass casing requires axially longer and heavier systems. Furthermore, there are problems with regard to the gaps occurring, which impair the flow through the bypass duct, and with regard to the ageing of non-metallic materials used for the bypass nozzle adjustments. In addition, strong three-dimensional flow effects in the bypass duct lead to flow losses. A reduction of the surface available for sound absorption is also disadvantageous.

A broad aspect of the present invention is to provide an aircraft gas turbine with a variable bypass nozzle, which while being simply designed and easily and cost-effectively producible, avoids the disadvantages of the state of the art and features a high efficiency.

It is a particular object of the present invention to provide solution to the above problems by a combination of the features described herein. Further advantageous embodiments of the present invention will become apparent from the present description.

In accordance with the invention, an aircraft gas turbine is thus provided with a core engine which is surrounded by a bypass duct. The bypass duct is enclosed radially outwards by a bypass wall, and a radially inner wall of the bypass wall (nacelle) forms with a radially outer wall of the core engine cowling a bypass nozzle (fan nozzle). It is provided in accordance with the invention that the radially inner wall of the bypass duct which is part of a cowling of the core engine or which encloses the latter includes an adjusting element extending in the circumferential direction of the inner wall and deformable radially outwards and hence into the bypass duct.

In accordance with the invention, a solution is thus provided in which the bypass wall, the trailing edge of the bypass wall and the entire engine cowling (nacelle) do not have to be designed adjustable. Instead, the adjusting element is arranged radially on the inside in the bypass duct and can thus have a lower diameter than the adjusting mechanisms known from the state of the art at the trailing edge of the bypass cowling.

A solution is thus provided in accordance with the invention in which a deformable or bendable design of the adjusting element is provided, the adjusting element being arranged on the inner wall of the bypass duct. The adjusting element in accordance with the invention can thus be arranged on the inner structure of the core engine cowling (inner fixed structure) and actuated from there. The adjusting element in accordance with the invention is thus located at the inner annulus area of the bypass duct. This permits, in a simple and easily monitorable manner, adjustment of part of the inner wall of the bypass duct, in order to thereby create a variable bypass nozzle.

In accordance with the invention, the adjusting element is designed elastic, preferably as a separate annular component. It thus forms a thin-walled and substantially cylindrical component which can be made of metal and bent in a simple manner. This additional adjustment or bending can in accordance with the invention be achieved without major energy input and in a very easily controlled manner.

The adjusting element is preferably moveable in the axial direction at its upstream area. It is particularly favourable here when a rigid ring element is provided at the upstream end area of the adjusting element, and is linked to an actuating device and moveable in the axial direction. An axial movement in the direction of the outflow area of the gas turbine thus results in a bulge of the adjusting element. As a result, the cross-section of the bypass nozzle is variably adjusted. Since bulging takes place in a predeterminable surface contour, the result is an optimized flow path inside the bypass duct, which is not disrupted by actuating elements, accessories or the like.

In a particularly favourable embodiment of the invention, the adjusting element is provided at its upstream area with at least one air inlet opening through which air from the bypass duct can be introduced into an internal annular space of the adjusting element. This results in a balloon effect, since this inflowing air leads to an additional "inflating" of the adjusting element. Hence a lower energy input is required for the actuating device, so that the latter can be designed with small dimensions. Furthermore, the stresses occurring are well and evenly distributed over the structure, preventing individual local stresses.

In a particularly favourable embodiment of the invention, it is furthermore provided that the adjusting element is given a sound absorbing element or a sound absorbing surface, so that additional sound absorption can be achieved and/or the existing sound absorbing measures are not impaired by the bypass nozzle in accordance with the invention. This results in a further noise reduction, in particular due to the elastic deformation of the component.

It is furthermore particularly favourable when the air from the interior of the adjusting element can be drawn off as cooling air, for example to cool the turbine casing of the aircraft gas turbine or to control the blade tip gap of the turbine. As a result, the entire structure is arranged radially closer to the turbine casing and does not require long inlet ducts.

The adjusting element in accordance with the invention is preferably connected at its downstream area to the supporting structure of the core engine cowling or to the core engine casing via an elastic flange structure. This can take the form of a bolted connection. The upstream area, in particular the rigid ring element, is preferably connected to the actuating device for example by tie rods or T-shaped hooks. This ensures a defined axial movement of the leading edge of the adjusting element.

Since the thermal insulation is provided in accordance with the invention by the inner supporting structure or by the casing of the core engine, the adjusting element in accordance with the invention of the variable bypass nozzle in accordance with the invention can be made of inexpensive and lightweight material. Furthermore, it is possible to dimension and arrange the adjusting element such that it covers assembly areas, in particular adjustable gaps or the like of the inner supporting structure of the bypass duct, such that the latter cannot cause any negative effects on the flow through the bypass duct.

The result in accordance with the invention is thus an inexpensive and lightweight overall structure that can be integrated into a turbine casing cooling system. There are possibilities for good noise absorption. The smooth ring lines at the leading-side area and the trailing-side area of the adjusting element lead, even with a reduced cross-section of the bypass nozzle, to good flow properties.

A further substantial advantage is that the design in accordance with the invention is easy to manufacture and assemble and also easy to maintain, which is in particular important since the adjusting element can be made of a metallic material which is superior to elastic materials with regard to its ageing.

Figure 2:
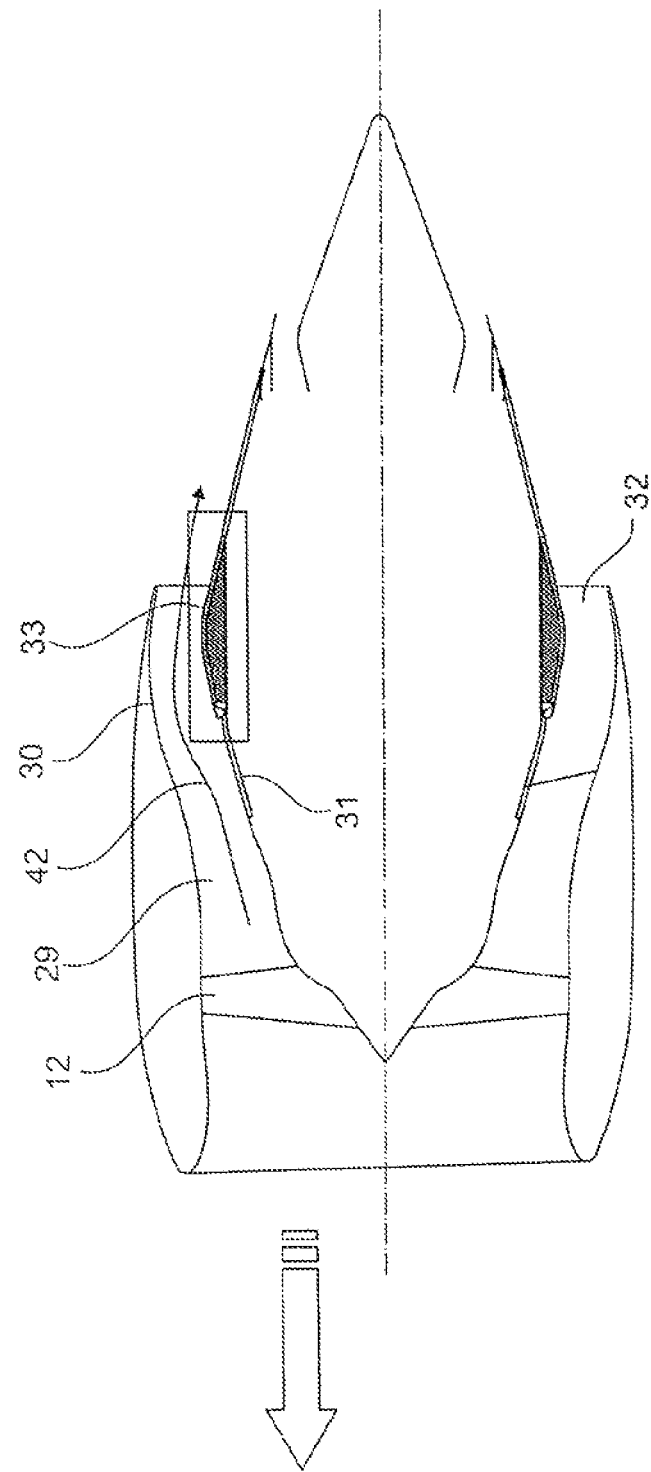
Figure 3:
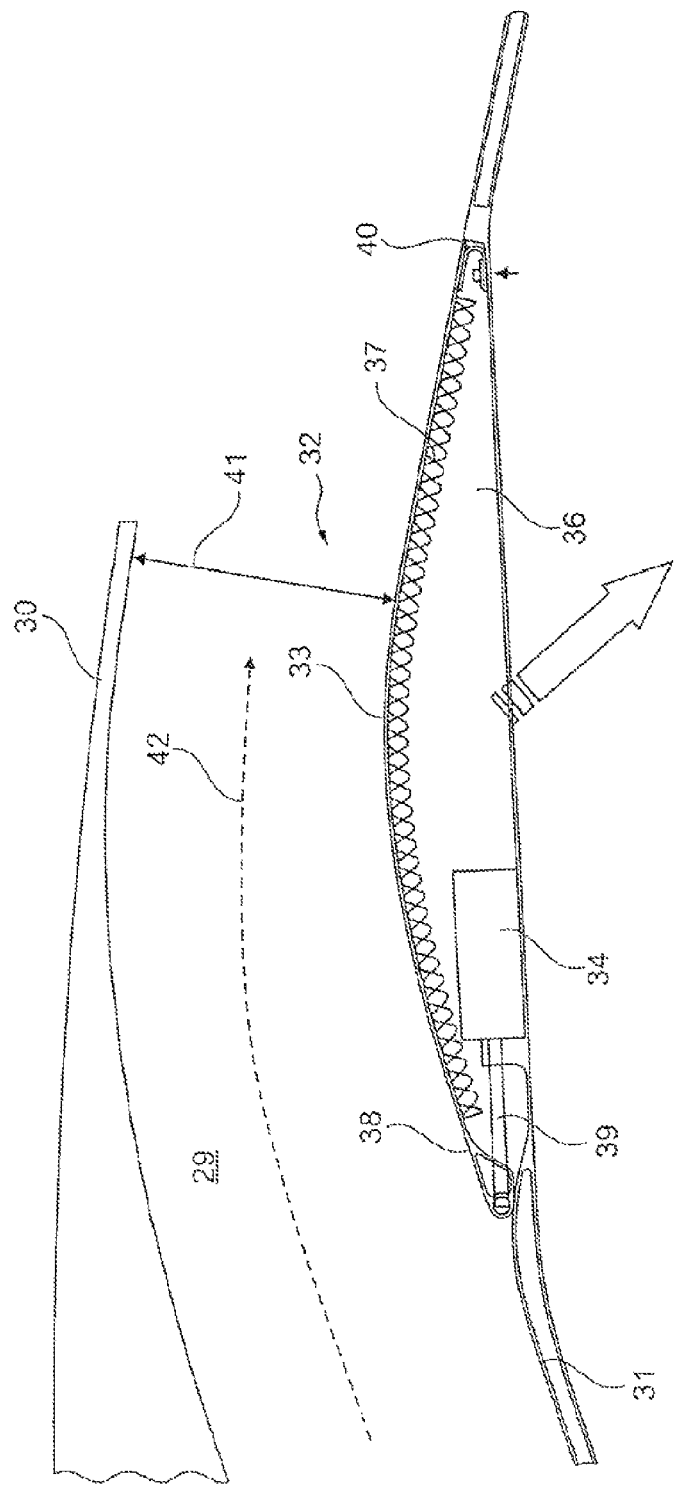
Figure 4:
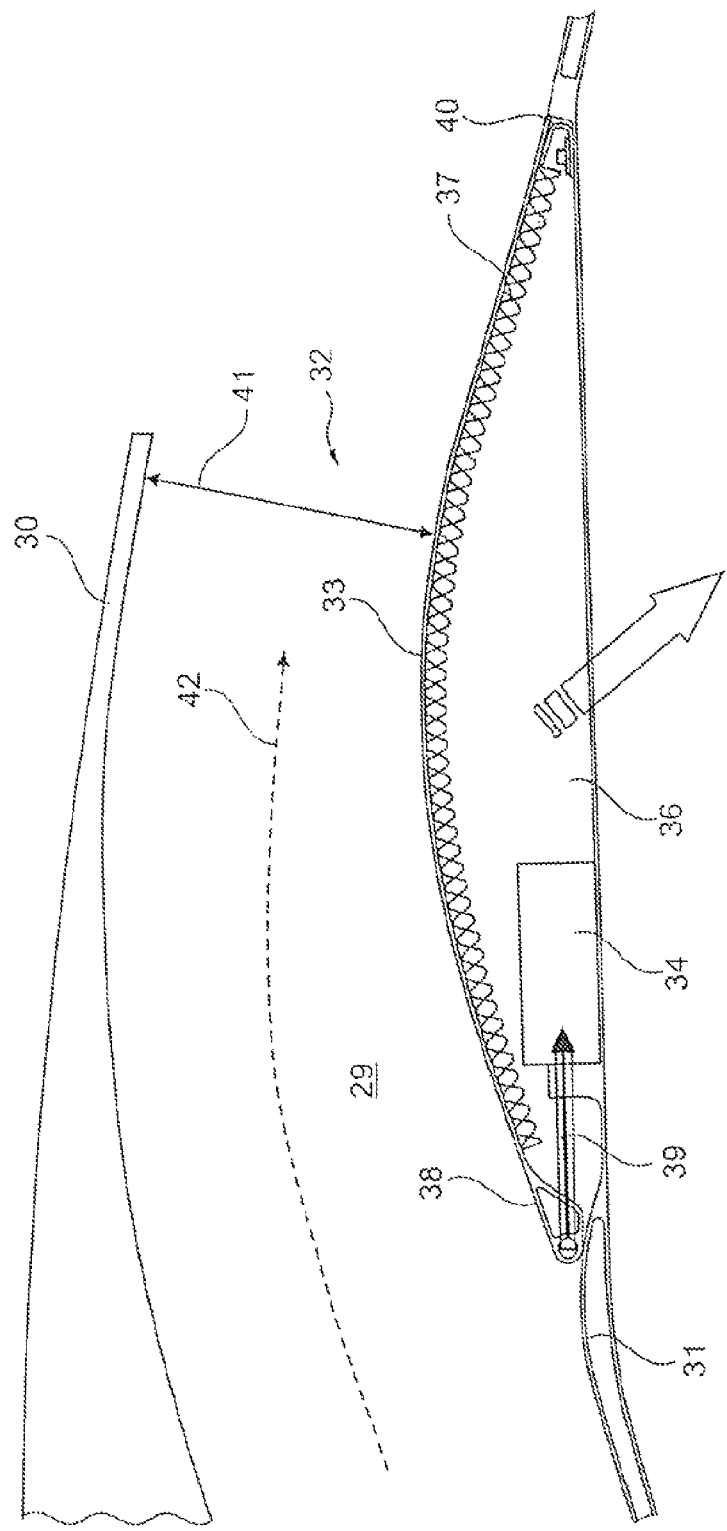
Figure 5:
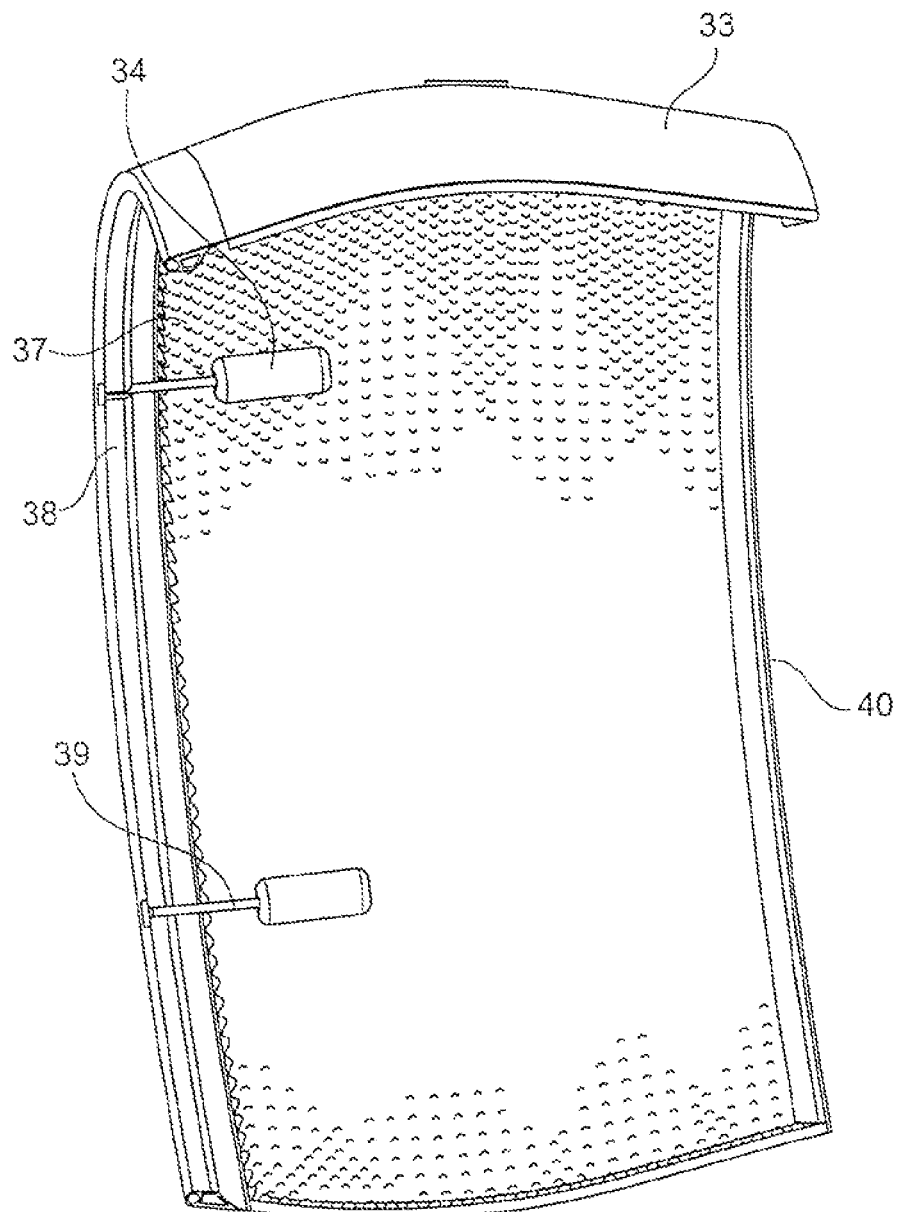
Figure 6:
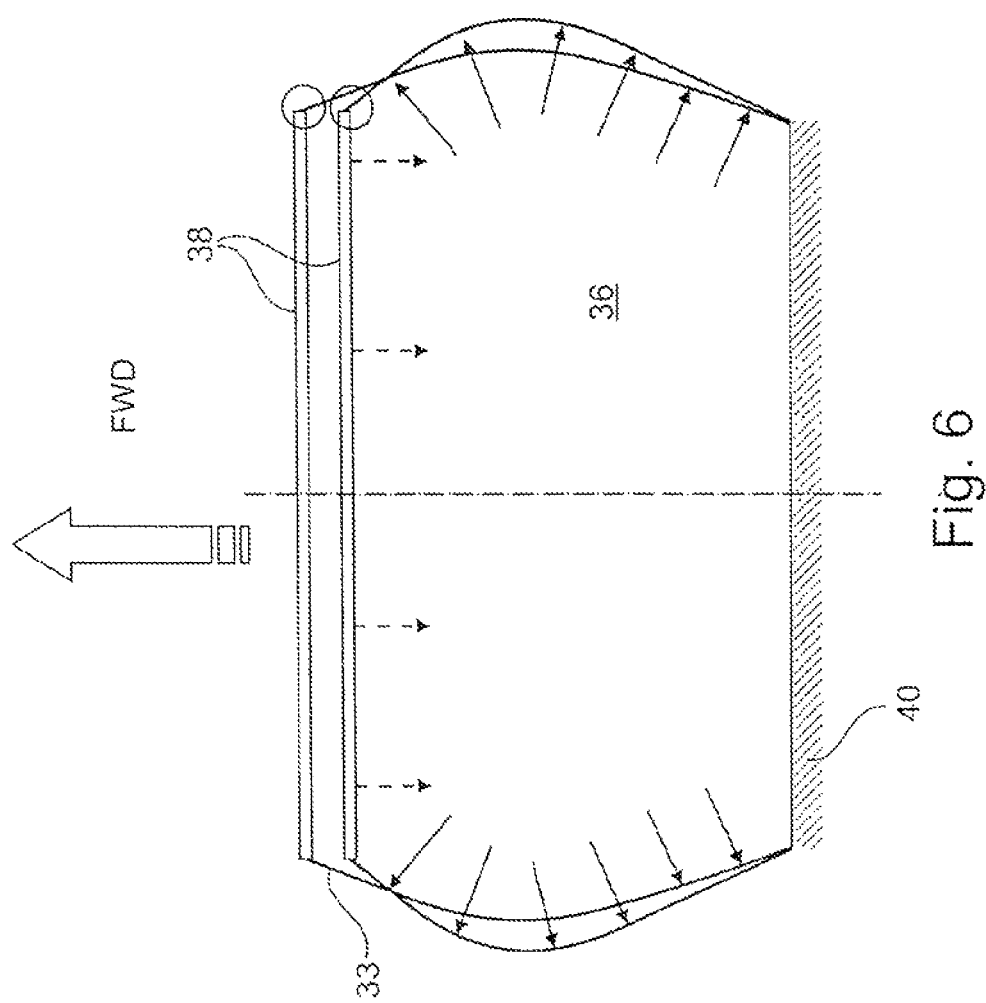
Figure 7:
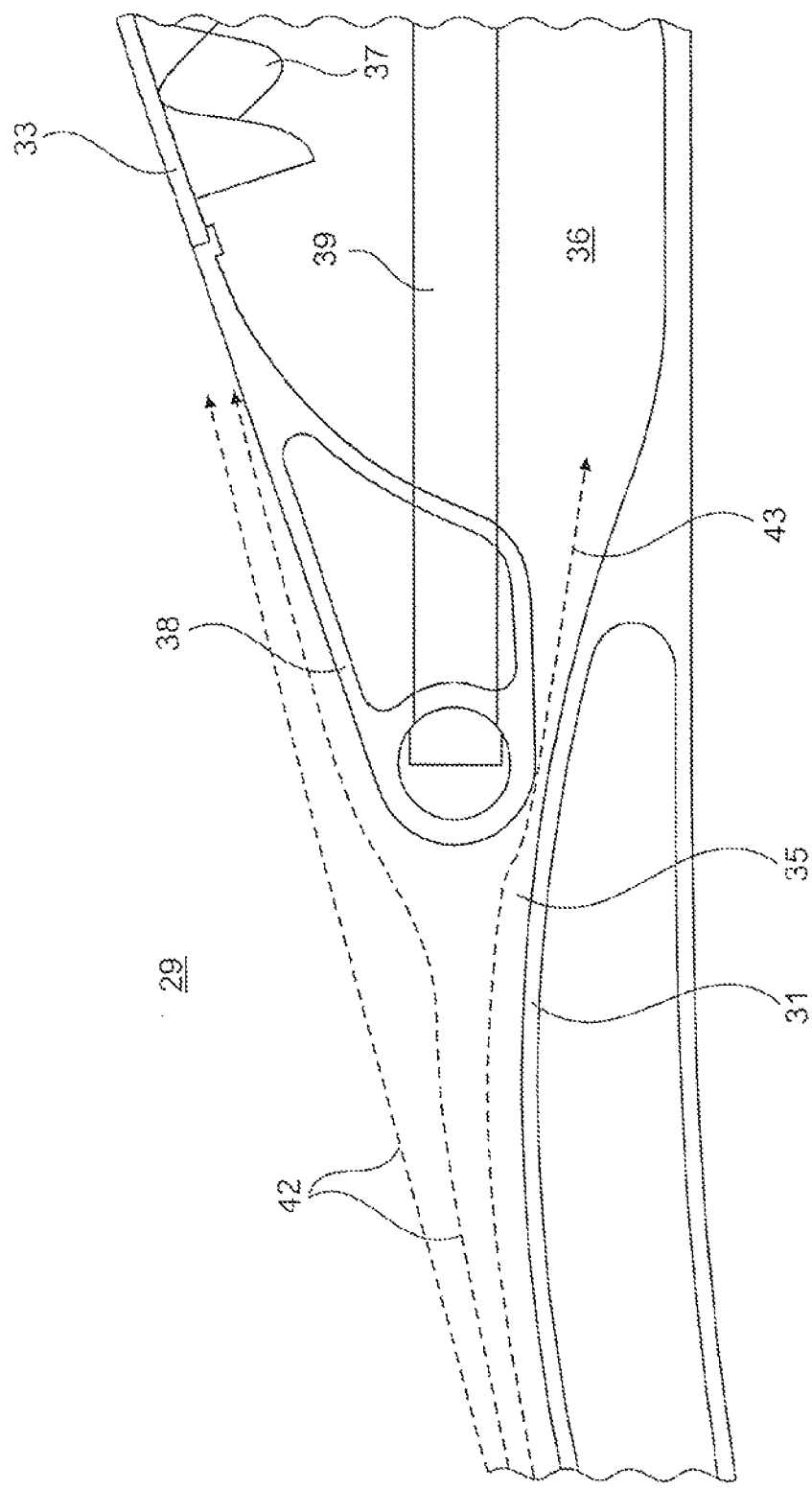

The present invention is described in the following in light of the accompanying drawing, showing an exemplary embodiment. In the drawing, FIG. 1 shows a schematic representation of a gas-turbine engine in accordance with the present invention, FIG. 2 shows a simplified view, similar to FIG. 1, with a representation of the bypass nozzle and the adjusting element in accordance with the present invention, FIG. 3 shows an enlarged representation of the detail shown in FIG. 2 in the normal state, FIG. 4 shows a view, by analogy with FIG. 3, in the state of a reduced nozzle cross-section, FIG. 5 shows a perspective partial view of the adjusting element in accordance with the present invention, FIG. 6 shows a simplified representation of the deformation of the adjusting element in accordance with the present invention, FIG. 7 shows a representation of the leading-side area of the adjusting element in accordance with the present invention, and FIG. 8 shows an enlarged representation of the trailing-side area of the adjusting element in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation. Reference numeral 28 designates an exhaust cone.

FIGS. 1 and 2 furthermore show a bypass duct 29 which is delimited radially outwards by a bypass wall 30, in particular an engine cowling (nacelle). The inner limitation is achieved by an inner wall 31. The walls 30 and 31 form a bypass nozzle 32.

FIGS. 3 and 4 show in detail the embodiment in accordance with the invention of the variable bypass nozzle, and show here in particular an adjusting element 33 which is designed annular and cylindrical (see also FIG. 5). The adjusting element 33 includes a metallic outer wall on whose radial inner side a sound absorbing element 37 is arranged. The latter can be fitted as a separate pant or in the form of a coating or lamination.

By means of an actuating device 34, which is for example designed as a hydraulic piston/cylinder unit and includes a tie rod 39, a ring element 38 to which the respective tie rod 39 is connected can be moved in the axial direction, for example using a T-shaped hook, as shown by the comparison of FIGS. 3 and 4. The ring element 38 is designed in one piece with the adjusting element 33, see also for example FIG. 7.

The trailing-side area is mounted using a retaining ring 40 of C-shaped cross-section, which can he designed in one piece or in the form of individual ring elements and is elastically deformable to permit an elastic deformation of the adjusting element 33 itself.

The comparison of FIGS. 3 and 4 shows that a bypass nozzle cross-sectional area 41 can be changed by an outward bulging of the adjusting element 33. The bypass duct flow 42 through the bypass duct 29 is shown in FIGS. 3 and 4. FIG. 3 shows a "normal state" in which the cross-sectional area 41 provided minimally inside the bypass nozzle is dimensioned in the usual way. By displacement of the ring element 38 in the axial direction by operating the actuating device 34 (FIG. 4), a reduction of the cross-sectional area 41 results. This process is shown again in FIG. 6, where in particular the balloon-like bulging of the adjusting element 33 can be seen very clearly.

FIG. 7 shows the inflow area of the variable bypass nozzle in accordance with the invention, where the ring element 38 is shown in particular. The result is that an air inlet opening (air gap) 35 is provided radially on the inside between the ring element 38 and the inner wall 31, through which opening an airflow 43 can flow into an inner annular space 36 formed by the adjusting element 33 in order to achieve the "balloon effect" described above. An axial displacement of the ring element 38 results in an initial bulging which is subsequently reinforced by the "balloon effect". The air accumulated in the inner annular space 36 leads to a positive pressure difference relative to the bypass duct flow 42 and thus reinforces the deformation of the adjusting element.

The ring element 38 has high stability, in particular to rotation in the circumferential direction, but permits the bulging of the adjusting element 33. The flow onto the ring element 38 is favourably designed and there are no backflows or vortex effects at the leading edge of the ring element 38.

FIG. 8 shows the downstream area of the adjusting element 33, in particular the elastic retaining ring 40 of C-shaped cross-section, The reference numeral 44 shows an airflow which can exit via a gap at the rear into the bypass duct flow 42.

LIST OF REFERENCE NUMERALS

1 Engine axis
10 Gas-turbine engine/core engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Bypass duct
30 Bypass wall (nacelle)
31 Inner wall
32 Bypass nozzle
33 Adjusting element
34 Actuating device
35 Air inlet opening (air gap)
36 Inner annular space
37 Sound absorbing element
38 Ring element
39 Tie rod
40 Retaining ring
41 Cross-sectional area
42 Bypass duct flow
43 Airflow
44 Airflow

What is claimed is:

1. An aircraft gas turbine, comprising:
a core engine;
a bypass duct surrounding the core engine, the bypass duct having a radially outer bypass wall and a radially inner wall, the radially outer bypass wall radially outwardly enclosing the bypass duct;
a bypass nozzle formed by the radially inner wall and the radially outer bypass wall;
a fan driven by the core engine for creating a pressurized flow of air in the bypass duct;
the radially inner wall including an adjusting element extending along a circumference of the radially inner wall and being deformable radially outwardly;
wherein the adjusting element includes at an upstream area of the adjusting element, at least one air inlet opening selectively openable to connect an inner annular space of the adjusting element to the pressurized flow of air in the bypass duct, the inner annular space including an exit opening at a downstream position thereof for exiting airflow from the inner annular space, the exit opening being configured with respect to the at least one air inlet opening to cause an accumulation of air and a positive pressure differential in the inner annular space with respect to the bypass duct when the at least one air inlet opening is selectively opened;
wherein the at least one air inlet opening is formed between the adjusting element and the radially inner wall;
and further comprising an actuating device connected to the adjusting element and constructed and arranged for axially moving the upstream area of the adjusting element with respect to the radially inner wall, the actuating device constructed and arranged to selectively open the at least one air inlet opening by axially moving the upstream area of the adjusting element away from the radially inner wall and selectively close the at least one air inlet opening by axially moving the upstream area of the adjusting element toward the radially inner wall, a downstream end of the adjusting element being substantially axially fixed and remaining substantially axially fixed during axial movement of the upstream area of the adjusting element;
the adjusting element having an outward bulging caused by a shortened axial length between the axially moved upstream area and the substantially axially fixed downstream end of the adjusting element when the upstream area of the adjusting element has been moved in the axial direction by the actuating device to selectively open the at least one air inlet opening;
the outward bulging of the adjusting element assisted by the accumulation of air and positive pressure differential in the inner annular space when the at least one air inlet opening is selectively opened;
the exit opening allowing the accumulation of air and positive pressure differential in the inner annular space to dissipate when the at least one air inlet opening is selectively closed.

2. The aircraft gas turbine in accordance with claim 1, wherein the adjusting element is elastic.

3. The aircraft gas turbine in accordance with claim 1, wherein the adjusting element includes a sound absorbing element positioned at a side of the adjusting element facing the bypass duct.

4. The aircraft gas turbine in accordance with claim 1, wherein the adjusting element is arranged as a separate component on a radially outer side of the radially inner wall.

5. The aircraft gas turbine in accordance with claim 1, wherein the adjusting element includes a sound absorbing element positioned at a side of the adjusting element facing the annular space.

6. The aircraft gas turbine in accordance with claim 1, wherein the adjusting element includes at the upstream area, a rigid ring element which is linked to the actuating device.

7. The aircraft gas turbine in accordance with claim 6, wherein the adjusting element is arranged as a separate component on a radially outer side of the radially inner wall.

8. The aircraft gas turbine in accordance with claim 7, wherein the rigid ring element is linked to the actuating device by at least one tie rod which is moveable in the axial direction.

9. The aircraft gas turbine in accordance with claim 8, wherein the adjusting element includes a sound absorbing element positioned at a side of the adjusting element facing the inner annular space.

10. The aircraft gas turbine in accordance with claim 9, wherein the adjusting element is elastic.

* * * * *